3,280,170
BISACRYLATE ESTERS
Lee A. Miller, Kirkwood, Mo., assignor to Monsanto Company, St. Louis, Mo., a corporation of Delaware
No Drawing. Filed Aug. 6, 1963, Ser. No. 300,168
13 Claims. (Cl. 260—470)

This application is a continuation-in-part of application S.N. 845,088, filed October 8, 1959, now abandoned.

This invention relates to some difunctional esters. More particularly this invention provides phenylene type aromatic compounds containing olefinic double bonds, carboxylic acid ester groups and oxygen ether linkages. The compounds of this invention are active in rubber polymer compositions as degradation inhibitors. They are active as biological toxicants, especially as herbicides, and are useful in the making of bis-epoxide compounds which are to be used as cross-linking agents for linear polymer systems.

According to the invention there are provided novel compounds having a general formula

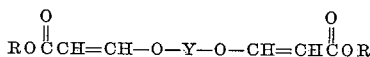

wherein R is an alkyl radical having from 1 to 6 carbon atoms, and Y is a bivalent radical selected from the group consisting of meta- and para-phenylene, 4,4'-alkylidenediphenyl, having from 1 to 12 carbon atoms in the alkylidene group, 4,4'-sulfonyldiphenyl, and said bivalent radicals having chlorine and bromine substitution in the phenyl ring thereof.

The compounds of the above-defined type wherein Y is a bivalent meta- or para-phenylene ring may be named generically as 1,3- or 1,4-bis(beta-carboalkoxyvinyloxy) benzene compounds. Illustrative examples are: 1,4-bis (beta - carboethoxyvinyloxy)benzene, 1,3-bis(beta-carbohexoxyvinyloxy)benzene and 1,4 - bis(betacarbopropoxyvinyloxy)-2,5-dichlorobenzene.

Compounds of the above-described type wherein Y is a bivalent 4,4'-alkylidenediphenyl radical having from 1 to 12 carbon atoms in the alkylidene group may be named generically as X,X-bis[para-(beta-carbomethoxyvinyloxy) phenyl]alkanes wherein X,X- denotes the carbon atoms' position of the substituent group and both X's are always the same. They may also be named as X,X-alkylidenebis-[4-phenyl(alkyl acrylates)] wherein "X,X" means the same as above. Illustrative examples of such compounds using the former terminology are:

2,2-bis[para-(beta-carbobutoxyvinyloxy)phenyl]hexane,
1,1-bis[para-(beta-carbohexoxyvinyloxy)phenyl]butane, and
4,4-bis[para-(carbomethoxyvinyloxy)phenyl]dodecane.

Compounds of the above-defined type wherein Y is a bivalent 4,4'-sulfonyldiphenyl radical may be named generically as 4,4' - bis(beta-carboalkoxyvinyloxy)diphenyl sulfones. Illustrative examples are 4,4'-bis(beta-carboisopropoxyvinyloxy)diphenyl sulfones, 4,4'-bis(beta-carbopentoxyvinyloxy)diphenyl sulfone, and 4,4'-bis(beta-carbomethoxyvinyloxy) - 3,3',5,5' - tetrabromodiphenyl sulfone.

Compounds of the present invention are prepared by reacting an alkyl propiolate such as the methyl, ethyl, propyl, isopropyl, butyl, tert-butyl, pentyl, mixed amyl, and hexyl esters of propiolic acid with a diphenol compound or chlorine- or bromine-substituted diphenol compound of the formula

HO—Y—OH where Y is a bivalent radical as defined above. Examples of such useful diphenolic reactants are: hydroquinone, resorcinol, 4,4'-isoproylidenediphenol, 4,4'-(3-hexylidene) diphenol, 4,4'-dihydroxydiphenylsulfone, and chlorinated and brominated substitution products thereof, e.g., 2-chlorohydroquinone, 5-bromoresorcinol, 3,3',5,5'-tetrachloro-4,4'-isopropylidenediphenol, and 3,3'-dichloro-4,4'-dihydroxydiphenyl sulfone.

The diphenolic compounds and the propiolic acid esters of the above described types are reacted at a temperature of about 0° C. to 150° C., and under atmospheric, subatmospheric or superatmospheric pressure. The reaction is effected in the presence of basic catalysts, and these may be of the organic or inorganic type. Suitable compounds are the alkali or alkaline earth metal hydroxides or basic salts of the alkali or alkaline earth metals, e.g., sodium hydroxide, sodium carbonate, potassium carbonate, calcium hydroxide, etc.; basic salts of organic acids, namely the basic salts of lower molecular weight fatty acids, e.g., sodium acetate, etc.; the alkali metal alkoxides, e.g., sodium methoxide, etc.; basic heterocyclic nitrogen compounds, e.g., pyridine, etc.; the quaternary amines, e.g., benzyltrimethylammonium hydroxide, etc. The addition of the diphenolic compounds to the propiolic acid ester may also be conducted in the presence of elemental alkali metal, e.g., sodium, potassium, lithium, etc. The basic agent or material is employed in relatively small quantities, thus pointing to the catalytic activity in contrast to the operation in which the diphenolic compound is converted to the salt, and then reacted in stoichiometric quantity with the propiolic acid ester. The base is used in an amount of about 0.001 to 5% based upon the weight of the propiolic acid ester, and preferably about 0.5 to 2% on the same basis. Usually, the quantity of catalyst which is used is relatively small so that no precautions need to be taken to separate the same from the product. However, when a nondistillable, strong base is employed in amounts of about 2% to 5% by weight, it is preferred to wash the product with an aqueous acidic compound such as, for example, ammonium chloride, etc.

The reaction between the diphenolic compound and the propiolic acid ester is one of addition, and requires one mol of the phenolic compound to two mols of the propiolic acid ester on a stoichiometric basis. However, either reactant can be readily separated from the reaction product, and therefore, an excess of either reactant can be employed within the scope of the present invention. If desired, following the reaction to form the acrylate, the acrylate can be converted by saponification of the ester to the free acid, through the use of a strong solution of alkali metal hydroxide, for example, about 15 to 50% aqueous solution of such bases as sodium hydroxide, potassium hydroxide, etc.

The reaction between the propiolic acid ester and the diphenol reactant is advantageously carried out in the presence of an inert organic diluent. The reactants may be combined with the diluent and catalyst and allowed to stand or be stirred until the formation of the bisacrylate occurs to the extent desired. The diluent is easily removed from the reaction mass by means of distillation. The diluents which may be employed are ether, dioxane, benzene, xylene, nitrobenzene, hexane, petroleum spirits, etc. The amount of diluent used in the reaction may vary considerably, but generally about 50 to 500% by weight, based on the total weight of reactants may be employed.

Examples of bisacrylate compounds produced by the procedure described above and the dihydric phenols from which they are obtained by reaction with the appropriate alkyl propiolates are 1,4-bis(beta-carbomethoxyvinyloxy)-benzene from hydroquinone; 1,3-bis(beta-carbobutoxyvinyloxy)benzene from resorcinol; and 1,4-bis(beta-carbohexoxyvinyloxy)-2,5-dibromobenzene from 2,5-dibromohydroquinone, 2,2 - bis[4-(beta-carbomethoxyvinyloxy)-phenyl]butane from 4,4'-(2-butylidene)diphenol; bis[4-

(beta-carbopropoxyvinyloxy)phenyl]methane from 4,4'-methylidenediphenol; 4,4'-bis(beta-carboethoxyvinyloxy)-diphenyl sulfone from 4,4'-sulfonyldiphenol; 4,4'-bis(beta-carbo-tert-butoxyvinyloxy)-3,3'-dichlorodiphenyl sulfone from 3,3'-dichloro-4,4'-diphenolsulfone and 4,4'-bis(beta-carbohexoxyvinyloxy)diphenylsulfone from 4,4'-diphenolsulfone.

The bisacrylates of the present invention have a wide variety of uses. For example, some have activity such as fungicides at concentrations of from about 10 to 10,000 parts per million. They are also used in natural and synthetic rubber compositions as anti-oxidants. These compounds are also particularly useful as monomers in the preparation of bis-epoxide compounds which bis-epoxide compounds are useful as cross-linking agents for linear polymeric products. For example the compound 1,3-bis($\beta$-carbomethoxyvinyloxy) - 4,6 - dichlorobenzene was active as a fungicide against the fungus *Venturia inaequalis* (apple scab) at 30 parts per million. As another example, the compound 1,4-bis(carbomethoxyvinyloxy)benzene had anti-ozone activity in a conventional synthetic styrene-butadiene copolymer rubber composition. Having thus provided description of our invention, reference will be had to the specific examples to provide a fuller understanding thereof.

Example 1

Eleven (11) g. of hydroquinone, 7.4 g. of methyl propiolate, 75 ml. of benzene and 1 ml. of pyridine were combined and heated to reflux temperature for 1 hour. To the reaction mass were added 100 ml. of benzene and 8.4 g. of methyl propiolate. The reaction mass was further heated at reflux temperature for a period of 11 hours. The reflux temperature was approximately 80° C. The benzene was removed from the reaction mass by evaporation leaving a blue-black solid. Initial purification of the solid was effected by means of crystallization from methanol. The desired fraction had a melting point of 122.5°–123.5° C. The yield was 38% by weight. The compound thus obtained was 1,4-di($\beta$-carbomethoxyvinyloxy)benzene. The empirical formula of this compound is $C_{14}H_{14}O_6$ giving a theoretical carbon content of 60.43% and a hydrogen content of 5.07%. By actual analysis it was found that the product had 60.31% carbon and 5.34% hydrogen. The structural formula of the compound was corroborated by means of infrared analysis.

Example 2

Twenty-two and eight-tenths (22.8) g. of 4,4'-isopropylidenediphenol, 18.5 g. methyl propiolate, 1 ml. of 40% solution of benzyltrimethylammonium methoxide in methanol as catalyst and 100 ml. of benzene were combined and refluxed for a period of 12 hours. The reflux temperature was approximately 80° C. The benzene was removed from the reaction mass by evaporation leaving a dark brown oil. On standing the oil crystallized into a solid. The solid material was purified by crystallization from methanol yielding a product having a melting point of 75.5–77° C. The yield of product was 81%. The product thus obtained is 2,2-di[p-($\beta$-carbomethoxyvinyloxy)phenyl]propane. The empirical formula of this compound is $C_{23}H_{24}O_6$ giving a theoretical carbon content of 69.68% and a hydrogen content of 6.10%. By actual analysis it was found that the carbon content of the product was 69.41% and the hydrogen content 5.99%. The structural formula of the compound was corroborated by means of infrared analysis.

Example 3

Twenty-five (25) g. of 4,4'-dihydroxydiphenylsulfone, 18.5 g. of methyl propiolate, 150 ml. of benzene and 1 ml. of 40% solution of benzyltrimethylammonium methoxide in methanol were combined and heated to reflux temperature for a period of 12 hours. The reflux temperature was approximately 80° C. The reaction mass was decanted to obtain a supernatant liquor and this liquor in turn was subjected to heat to drive off benzene leaving a gray solid product. The gray solid product was purified by recrystallizing from methanol giving a product having a melting point of 150–151° C. The product thus obtained was 4,4'-di($\beta$-carbomethoxyvinyloxy) diphenyl sulfone. The empirical formula of this compound is $C_{20}H_{18}O_8S$ giving a theoretical carbon content of 57.41% and a hydrogen content of 4.33%. By actual analysis it was found that the product contained 57.28% carbon and 4.17% hydrogen. The structural formula was confirmed by means of infrared analysis.

Example 4

This example illustrates the usefulness of the compounds of this invention as intermediates in the preparation of bis-epoxide compounds which are useful for making resins, and as cross-linking agents for natural and synthetic linear polymer systems.

A mixture of 0.05 mole of 2,2-di[p-($\beta$-carboethoxyvinyloxy)phenyl]propane, 0.1050 mole of perbenzoic acid in about 250 ml. of chloroform is stirred at room temperature and 1-ml. aliquots of the reaction mixture are analyzed hourly with 0.1 N sodium thiosulfate to follow the course of the reaction. When the analysis indicate that the perbenzoic acid is about all used up (about 5 hours later), the reaction mixture is washed successively with two 100-ml. portions of 10% aqueous sodium bicarbonate solution and then with two 100-ml. portions of distilled water. The reaction mixture is dried over sodium sulfate, filtered, and the filtrate is evaporated to give as product the bis-epoxide product 2,2-di[p-($\beta$-carboethoxyepoxyethoxy)phenyl]propane.

Example 5

The procedure of Example 4 is repeated replacing the 2,2 - di[p-($\beta$-carboethoxyvinyloxy)phenyl]propane with 0.05 mole of 4,4'-di($\beta$-carbopropoxyvinyloxy)diphenyl sulfone to obtain as the bis-epoxide product, 4,4'-di($\beta$-carbopropoxyepoxyethoxy)diphenyl sulfone.

Example 6

The procedure of Example 4 is repeated replacing the 2,2 - di[p-($\beta$-carboethoxyvinyloxy)phenyl]propane with 0.05 mole 1,4-bis($\beta$-carbohexoxyvinyloxy)benzene to obtain as product 1,4-bis($\beta$-carbohexoxyepoxyethoxy)benzene.

I claim:
1. A compound having a formula

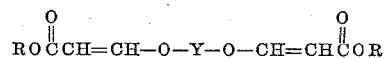

wherein R is an alkyl radical having from 1 to 6 carbon atoms, and Y is a bivalent radical selected from the group consisting of meta- and para-phenylene, 4,4'-alkylidenediphenyl having from 1 to 12 carbon atoms in the alkylidene group, 4,4'-sulfonyldiphenyl, and said bivalent radicals having halogen substitution on the phenyl ring thereof.

2. A compound as described in claim 1 wherein Y is a bivalent para-phenylene radical.

3. A compound as described in claim 1 wherein Y is a bivalent meta-phenylene radical substituted with halogen.

4. A compound as described in claim 1 wherein Y is a bivalent 4,4'-alkylidenediphenyl radical having from 1 to 12 carbon atoms in the alkylidene group.

5. A compound as defined in claim 1, wherein the halogen substitution on the phenyl ring thereof is chlorine or bromine.

6. A compound as described in claim 1 wherein Y is a bivalent 4,4'-sulfonyldiphenyl radical.

7. 1,4-di($\beta$-carbomethoxyvinyloxy)benzene.

8. 2,2-di[p-(β-carbomethoxyvinyloxy)phenyl]propane.
9. 4,4'-di(β-carbomethoxyvinyloxy)diphenyl sulfone.
10. 4,6 - dichloro-1,3-di(β-carbomethoxyvinyloxy)benzene.
11. 2,2-di[p-(β-carboethoxyvinyloxy)phenyl]propane.
12. 4,4'-di(β-carbopropoxyvinyloxy)diphenyl sulfone.
13. 1,4-bis(β-carbohexoxyvinyloxy)benzene.

No references cited.

LORRAINE A. WEINBERGER, *Primary Examiner.*
R. K. JACKSON, *Assistant Examiner.*